US011807184B2

(12) United States Patent
Ugarte Alba

(10) Patent No.: US 11,807,184 B2
(45) Date of Patent: Nov. 7, 2023

(54) VEHICLE OCCUPANT PROTECTION SYSTEM AND METHOD FOR PROTECTING A VEHICLE OCCUPANT

(71) Applicant: Dalphi Metal Espana S.A., Vigo (ES)

(72) Inventor: Óscar Ugarte Alba, Valladolid (ES)

(73) Assignee: Dalphi Metal Espana, S.A., Vigo (ES)

( * ) Notice: Subject to any disclaimer, the term of this patent is extended or adjusted under 35 U.S.C. 154(b) by 0 days.

(21) Appl. No.: 17/626,627

(22) PCT Filed: Jul. 8, 2020

(86) PCT No.: PCT/EP2020/069274
§ 371 (c)(1),
(2) Date: Jan. 12, 2022

(87) PCT Pub. No.: WO2021/008973
PCT Pub. Date: Jan. 21, 2021

(65) Prior Publication Data
US 2022/0379834 A1    Dec. 1, 2022

(30) Foreign Application Priority Data

Jul. 12, 2019  (DE) .......................... 102019118970.5

(51) Int. Cl.
*B60R 21/2338* (2011.01)
*B60R 21/239* (2006.01)

(52) U.S. Cl.
CPC ........ *B60R 21/2338* (2013.01); *B60R 21/239* (2013.01); *B60R 2021/23384* (2013.01)

(58) Field of Classification Search
CPC .................. B60R 21/2338; B60R 2021/23384
See application file for complete search history.

(56) References Cited

U.S. PATENT DOCUMENTS

| | | | |
|---|---|---|---|
| 6,592,146 B2* | 7/2003 | Pinsenschaum | B60R 21/276 280/739 |
| 7,490,854 B2* | 2/2009 | Thomas | B60R 21/2338 280/739 |
| 7,552,942 B2* | 6/2009 | Fischer | B60R 21/2338 280/739 |
| 7,784,828 B2* | 8/2010 | Matsu | B60R 21/233 280/739 |

(Continued)

FOREIGN PATENT DOCUMENTS

| | | |
|---|---|---|
| DE | 102006028510 A1 | 2/2007 |
| DE | 102009011830 A1 | 12/2009 |

OTHER PUBLICATIONS

International Search Report and Written Opinion for PCT/EP2020/069274 dated Aug. 28, 2020 (9 pages; with English translation).

*Primary Examiner* — Paul N Dickson
*Assistant Examiner* — Tiffany L Webb
(74) *Attorney, Agent, or Firm* — Kristin L. Murphy

(57) ABSTRACT

In a vehicle occupant protection system, a first tether is permanently fastened to a front panel of the airbag and is detachably fixed to an actuator unit on the module side. A second tether is arranged on the module side and is connected to the first tether, wherein in an extension of the second tether there is provided a decoupling arrangement which is located between the second tether and the first tether only when the actuator unit is activated.

17 Claims, 14 Drawing Sheets

(56) References Cited

U.S. PATENT DOCUMENTS

| | | | | |
|---|---|---|---|---|
| 8,419,058 B2* | 4/2013 | Fischer | ................ | B60R 21/233 |
| | | | | 280/739 |
| 8,632,095 B2* | 1/2014 | Fischer | ................ | B60R 21/233 |
| | | | | 280/739 |
| 2011/0021723 A1 | 1/2011 | Yanagisawa | | |
| 2019/0111880 A1 | 4/2019 | Choi | | |

* cited by examiner

VEHICLE OCCUPANT PROTECTION SYSTEM AND METHOD FOR PROTECTING A VEHICLE OCCUPANT

CROSS-REFERENCE TO RELATED APPLICATIONS

This application is a national stage of International Application No. PCT/EP2020/069274, filed Jul. 8, 2020, the disclosure of which is incorporated herein by reference in its entirety, and which claimed priority to German Patent Application No. 102019118970.5, filed Jul. 12, 2019, the disclosure of which is incorporated herein by reference in its entirety.

TECHNICAL FIELD

The disclosure relates to a vehicle occupant protection system comprising an airbag module as well as to a method for protecting a vehicle occupant.

BACKGROUND

Airbags within an airbag module mounted in a vehicle interior are basically optimized to a specific distance of a vehicle occupant from the airbag module. There are known solutions for compensating certain relatively small variations of the sitting distance that are caused, for example, by a smaller vehicle occupant displacing the seat more closely toward the vehicle front end than a taller vehicle occupant. In this respect, in one solution an airbag volume is varied by releasing a tether located inside the airbag via an actuator unit, when the airbag is intended to fill up to a lamer volume. Moreover, it is known to provide, in a panel of the airbag, a venting device through which gas may be discharged from the interior of the airbag, where necessary, to render the airbag softer and, for example, to provide for more gentle catching of a smaller and lighter vehicle occupant.

However, in vehicles driving autonomously the freedom of movement of the vehicle occupants inside the vehicle interior is to be significantly increased. For example, the vehicle occupants are intended to move their vehicle seat into a comfort position in which the vehicle seat is arranged at a considerably larger distance from a vehicle front end than this has been possible so far for the driver as well as for the passenger. Further, the option of folding back the backrest of the seat even during driving to adopt a sleeping position is to be frequently provided.

What is needed is the ability to protect the vehicle occupant by an airbag in a situation of restraint both at a normal driving position and e.g. at a comfort position, especially by a flexibly usable vehicle occupant safety system.

SUMMARY

A vehicle occupant protection system comprising the features of claim 1 is disclosed. The vehicle occupant protection system includes an airbag module comprising an airbag having first and second tethers extending in an interior of the airbag and an actuator unit fixed to the module. The first tether is permanently fixed to an airbag-side fastening point on a front panel of the airbag and is detachably fixed, on a module side, to an actuator unit in a first module-side fastening point. The second tether is attached, on the module side, to a second module-side fastening point and is connected to the first tether at a tether connecting point. In the course of the second tether between the second module-side fastening point and the tether connecting point, a decoupling arrangement is provided which triggers when a predetermined force threshold is exceeded. An activation of the actuator unit releases the first tether on the module side. Only when the actuator unit is activated, is the decoupling arrangement located in the flow of forces between the second module-side fastening point of the second tether and the airbag-side fastening point of the first tether.

In one exemplary arrangement, the actuator unit is a so-called tether activation unit in which e.g. a pyrotechnical explosive stud is provided which secures the first tether on the module side prior to activation of the actuator unit and is split upon activation of the actuator unit, thus releasing the first tether on the module side. Of course, the actuator unit could as well be designed differently, for example via a spring mechanism.

Here, at the same time a fastening fixed to the module is also understood to be a fastening fixed to the vehicle, because the airbag module usually is mounted tightly and fixedly within the vehicle. The fastening fixed to the module may be carried out, for example, on a housing of the airbag module, on a gas generator of the airbag module or on a component fixed to the vehicle in the direct vicinity of the airbag module.

In one exemplary arrangement, the first tether is connected to the actuator unit at its first module-side fastening point only.

According to the disclosure, the decoupling arrangement can trigger only when the actuator unit is activated, as only in such case a sufficiently high force which enables exceeding of the predetermined force threshold will act on the decoupling arrangement.

In general, the decoupling arrangement is configured to include two members interconnected before the force threshold is exceeded which detach from each other when the force threshold is exceeded. Thus, the decoupling arrangement may be a simple predetermined breaking point, for example, such as in the form of a tear seam or a perforation, a deformable lug at a module-side fastening of the second tether but also an appropriate more complex mechanical device. As a rule, triggering takes place directly by a mechanical force which is above the force threshold acting on the decoupling arrangement.

The first tether should be fixed to the front panel of the airbag from inside. At the front panel of the airbag there is formed a baffle provided for catching, in a situation of restraint, the vehicle occupant moving forward within the vehicle who is sitting in a vehicle seat assigned to the airbag module.

The disclosure can be realized both for a driver airbag module in a steering wheel and for a passenger airbag module e.g. in an instrument panel or any other component fixed to the vehicle, but is not restricted to said applications.

When the actuator unit is not activated in a situation of restraint, the first tether advantageously determines the distance of the front panel of the airbag from the airbag module by its length between its first module-side fastening point and its airbag-side fastening point. Accordingly, the airbag is filled with a first smaller volume with filling gas. The filling gas is usually supplied by a gas generator of the airbag module. This process is desired, for example, when the vehicle seat and, consequently, the vehicle occupant are located in a driving position relatively close to the airbag module, i.e. close to the steering wheel or the instrument panel.

When, on the other hand, in a situation of restraint, the actuator unit is activated and the decoupling arrangement is triggered, the first tether is released and will lose its influence on the shape and the volume of the filled airbag. Then the airbag will be filled up to a second larger volume.

This case may occur when the vehicle seat is located in a position significantly further distant from the airbag module than in the driving position, or when the backrest of the vehicle seat is folded back, for example in a comfort position that may be adopted during autonomous driving.

Although, in another possible scenario, in a situation of restraint the actuator unit is activated, the decoupling arrangement is not triggered. In such an event, the airbag is filled up to the first smaller volume only, as the first tether is kept fixed to the airbag module. In addition, further actions are possible which can be triggered via the actuator unit and which will be detailed in the following so that there is an option of additional method steps.

In one exemplary arrangement, the first tether is an elongate strip-shaped piece of fabric, especially made from airbag fabric.

In one exemplary arrangement, the second tether is a component separate from the first tether, for example a fabric tape which is especially made from airbag fabric. Optionally, the second tether is made from different material or is made substantially from the decoupling arrangement.

However, it is also contemplated that the second tether merges integrally into the first tether at the tether connecting point and thus constitutes a portion of the first tether. In this exemplary arrangement, the division between the first tether and the second tether is virtually given by the first module-side fastening point and the decoupling arrangement, wherein the tether connecting point may be substantially any point between said two locations.

The decoupling arrangement can be bridged, when the actuator unit is not activated, by the first module-side fastening point of the first tether being located behind the tether connecting point and the second module-side fastening point of the second tether in a tether extension from the second module-side fastening point of the second tether via the tether connecting point and the first module-side fastening point of the first tether at the actuator unit to the airbag-side fastening point of the first tether, when viewed in the direction of the airbag-side fastening point of the first tether. As long as the first tether is connected at the first module-side fastening point via the actuator unit to the airbag module and thus to the vehicle, all forces acting on the first tether, when the latter is tensioned between the front panel of the airbag and the actuator unit, are transferred into the vehicle via said fastening point and are not transmitted to the second tether and the decoupling arrangement. Hence the second tether and especially the decoupling arrangement are completely prevented from being loaded. Consequently, in this event it is not possible either that force exceeding the force threshold acts on the decoupling arrangement.

It is another option that the second tether is longer than the length of the first tether between the first module-side fastening point and the tether connecting point. When the first tether tightens between the front panel of the airbag and the actuator unit, the second tether remains slack so that no forces exceeding the force threshold can act on the decoupling arrangement.

When the actuator unit is actuated, the forces acting on the first tether also act on the decoupling arrangement, as the first fastening point at the first tether is no longer fixed tightly to the vehicle. It is crucial here whether the forces acting on the decoupling arrangement exceed the force threshold or not. In the first case, the decoupling arrangement triggers, and the first tether is completely released on the module side. In the second case, the first tether remains fixed on the module side via the second tether.

Of preference, the length of the second tether and the length of the first tether are selected to be as short as possible between the first module-side fastening point and the tether connecting point so that, in the afore-described event, when the actuator unit is activated but the decoupling arrangement will not trigger, the total length of the tether extension will increase only insignificantly from the second module-side fastening point of the second tether to the airbag-side fastening point of the first tether vis-á-vis the length of the first tether from the first module-side fastening point to the airbag-side fastening point of the first tether. The volume of the airbag in the filled state should be equal in both cases for practical needs.

In one exemplary arrangement, the force threshold is preferably selected so that, with the actuator unit being activated, during an initial phase or a middle phase of the filling of the airbag the first tether exerts force on the decoupling arrangement that is above the force threshold, whereas in a final phase of filling a force which the first tether exerts on the decoupling arrangement remains always below the force threshold. The final phase of filling in this case is understood to be the period in which at least about 80% to 95% of the first smaller volume of the airbag have been filled already and the deployment and positioning of the airbag within the vehicle interior is completed already so that the airbag has already substantially reached its intended shape and position. Especially a movement of the front panel of the airbag to its final position in the vehicle interior is completed already so far that no more substantial tensile forces are exerted on the first tether.

When the actuator unit is activated already at the beginning of the filling of the airbag, the front panel of the airbag moving away from the airbag module in the vehicle interior causes high forces to act on the first tether, which forces are transmitted to the decoupling arrangement. As a consequence, the decoupling arrangement caused to trigger, resulting in the fact that the first tether is completely released on the module side. Therefore, the airbag can deploy and fill into its second larger volume.

When, however, the actuator unit is activated as late as at a point in time at which the front panel of the airbag has already substantially reached its final position, only low tensile forces which are not sufficient to trigger the decoupling arrangement will act on the first tether so that the first tether remains fixed to the vehicle on the module side via the second tether and the second module-side fastening point. Filling of the airbag is completed in this case when the airbag has reached its first smaller volume.

The first tether can be restricted to the length between the airbag-side fastening point at the front panel of the airbag and the tether connecting point to the second tether.

In one exemplary arrangement, however, the first tether is permanently fastened to the airbag-side fastening point on the front panel at a first end and at a second end on the airbag panel, especially equally on the front panel, and the first module-side fastening point and the tether connecting point are located between the two ends of the first tether. In this way, the tensile forces are transmitted at plural positions to the front panel, when the actuator unit is not activated or when the decoupling arrangement is not triggered, thereby allowing to influence the shaping of the airbag in the first smaller volume thereof.

In this case, as afore-described, the length of the second tether should be selected to be longer than the length of the first tether between the first module-side fastening point and the tether connecting point so that, when tensile force acts on the portion of the second tether between the tether connecting point and the airbag-side fastening point of the second end of the first tether, no important forces can act on the decoupling arrangement.

The tether connecting point and thus the connection to the second tether may be located approximately in the middle of the length of the first tether, for example. Thus, when the actuator unit is not activated, for the first tether a V-shaped extension is resulting and, when the actuator unit is activated and the decoupling means is not triggered, a Y-shaped extension is resulting, wherein the stem of the Y that is formed by the second tether should be kept as short as possible.

In one exemplary arrangement, the first tether does not detach from the airbag panel even in the case of restraint.

The only detachable fixations generally are the first module-side fastening point of the first tether at the actuator unit and the decoupling arrangement at the second tether.

The position of the decoupling arrangement between the second module-side fastening point and the tether connecting point may be selected at will. It is possible, for example, to provide the decoupling arrangement directly at the second module-side fastening point or at the tether connecting point. Here, for example simply a connecting seam in the form of a tear seam may be used. It would also be imaginable, however, to design the decoupling arrangement in the form of a perforation in the extension of the second tether, for example. As a matter of course, also any other form of decoupling arrangement, even in the form of a more complex mechanism, can be employed.

In one exemplary arrangement, a venting device is provided on which a venting tether acts which extends inside the airbag and which is detachably connected to the actuator unit. The venting device is formed, e.g., by a venting hole in the airbag panel provided with a flap, the venting hole being opened or closed by pulling the venting tether. This is dependent on the design of the venting device, wherein the venting device and thus the venting hole are preferred to remain closed until the venting tether is being tensioned, and only when the venting tether is released, will the flap be opened, will the venting hole be released and thus the venting device be opened.

In one exemplary arrangement, the venting tether is a component that is completely separate from the first and second tethers.

Releasing the venting tether by the actuator unit corresponds to the additional step already described before which may take place in a scenario where the actuator unit is activated but the decoupling arrangement does not trigger.

In one exemplary arrangement, the venting device is designed so that the venting device is opened only when the venting tether is released by the actuator unit.

Opening or closing the venting device will influence the hardness of the airbag and thus the load which the airbag opposes to the impacting vehicle occupant. This is another parameter that is variable in the vehicle occupant protection system according to the disclosure.

It has turned out to be advantageous when the venting device is opened that a vehicle seat is provided which can adopt a first position and a second position, the vehicle seat in the second position being further distant from the airbag module by a factor of about 1.2 to 2.5, especially by a factor or about 1.5 to 2 than in a first position, wherein the airbag in a first position of the vehicle seat in the filled state adopts the first smaller volume and in the second position of the vehicle seat in the filled state adopts the second larger volume.

As already mentioned before, the first position of the vehicle seat corresponds, for example, to a normal driving position in which especially a vehicle occupant on the driver seat himself/herself operates the steering wheel, while the second position corresponds to a comfort position which can be adopted especially when the vehicle drives autonomously, and in which the vehicle seat is distant from the steering wheel e.g. so far that the vehicle occupant sitting in the driver seat cannot operate the steering wheel any more. Where necessary, in the comfort position also a backrest of the vehicle seat can be folded back so that the vehicle occupant may adopt a sleeping position.

Via the different airbag volumes, the difference in distance can be compensated so that the vehicle occupant sitting in the vehicle seat can be protected in a restraint situation in both sitting positions.

The method for protecting a vehicle occupant can be carried out especially by an afore-described vehicle occupant protection system. In a situation of restraint occurring when the vehicle seat is in the first forward position, the airbag of the airbag module with the first smaller volume is filled. Moreover, in response to a height of the vehicle occupant sitting in the vehicle seat, the venting device of the airbag is opened or closed. In a situation of restraint occurring when the vehicle seat is in the second rearward position, however, always the airbag with the second larger volume is filled and the venting device is opened.

Here, in an exemplary arrangement in a restraint situation in which the vehicle seat is in the first position, the actuator unit is always not activated or is activated as late as in a final phase of the filling of the airbag, and the decoupling arrangement does not trigger, whereas in a restraint situation in which the vehicle seat is in the second position the actuator unit is always activated and the decoupling arrangement triggers so that the first tether is released on the module side.

This ensures the airbag to reach the second larger volume only when the vehicle seat is in the second position.

When a venting device having a venting tether is provided, in the afore-described vehicle occupant protection device in a situation of restraint in the second sitting position the venting device is basically opened so that the airbag becomes softer as upon activation of the actuator unit the venting tether is always released on the module side. In a restraint situation occurring when the vehicle seat is in the first sitting position, however, activation of the actuator unit will decide on whether the venting device is opened or remains closed, viz. on whether the airbag is set to be harder or softer.

When a venting device is provided, preferably a discrimination between a taller vehicle occupant or a smaller vehicle occupant in the vehicle seat results in the actuator unit being activated in a final phase of the filling of the airbag, when the vehicle occupant has the second smaller body height, and in the actuator unit being not activated when the vehicle occupant has the first taller body height. Thus, it is ensured that a taller vehicle occupant can be safely caught, while it is equally ensured that a smaller vehicle occupant will not be exposed to any excessive restraining forces. The differentiation between a smaller vehicle occupant and a taller vehicle occupant may be related, for example, to standardized 50% dummies and 95% dummies or to standardized 5% dummies and 50% dummies.

As already afore-described, in the first position of the vehicle seat the actuator unit is activated and the first tether is released not before the force threshold of the decoupling arrangement is no longer exceeded by the filling of the airbag. Therefore, the airbag always deploys up to its first smaller volume only. Activation of the actuator unit in this case results in the fact that the venting tether is released and the venting device is opened. The related possible small increase in volume of the airbag is not relevant in practice.

BRIEF DESCRIPTION OF DRAWINGS

Hereinafter, the disclosure shall be described in detail by way of an example arrangement with reference to the attached figures, wherein in the drawings.

DETAILED DESCRIPTION

Figure 1:
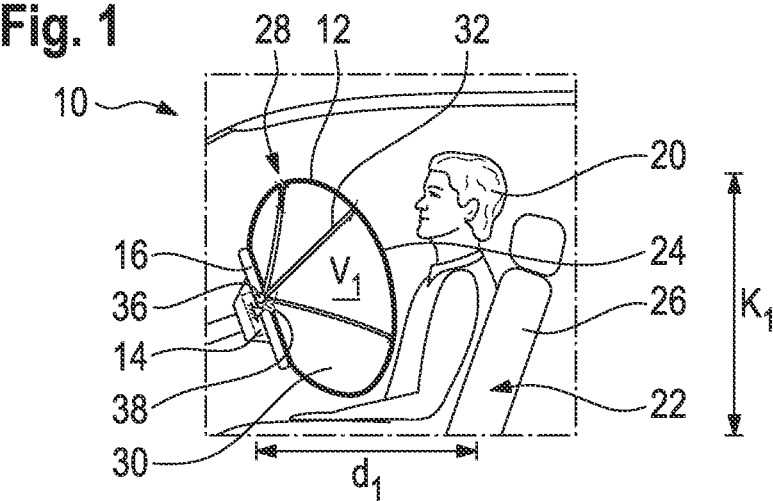
FIG. 1 shows a schematic representation of a vehicle occupant protection system according to the disclosure for carrying out a method according to the disclosure, comprising a vehicle seat which is in a first forward position and an airbag being which is filled up to a first smaller volume in a first situation of restraint, an actuator unit being not activated.
Figure 2:
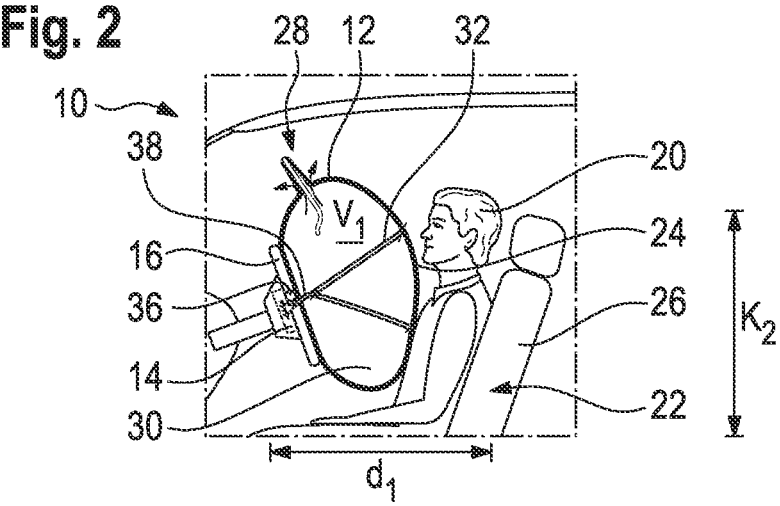
FIG. 2 shows the vehicle occupant protection system of FIG. 1 in a second situation of restraint, the actuator unit being activated.
Figure 3:
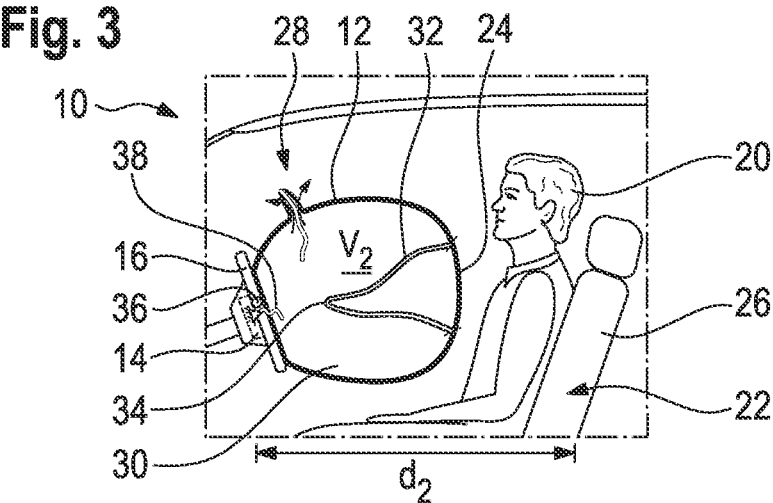
FIG. 3 shows the vehicle occupant protection system of FIG. 1 in a third situation of restraint, wherein the vehicle seat is in a second rearward position of the vehicle seat and the airbag is filled up to a second larger volume, the actuator unit being activated.

FIGS. 1 to 3 illustrate a vehicle occupant protection system 10 in three different restraint situations, FIG. 1 representing a first restraint situation, FIG. 2 representing a second restraint situation and FIG. 3 representing a third restraint situation.

The vehicle occupant protection system 10 comprises an airbag 12 which in a situation of restraint fills with filling gas. The airbag 12 is part of an airbag module 14 not shown in detail which also comprises a gas generator (not shown) which supplies the filling gas for the airbag 12 in a known way.

In the example shown here the airbag module 14 is accommodated in a steering wheel 16 of a vehicle so that the airbag 12 is designed as a driver airbag.

Figure 6:
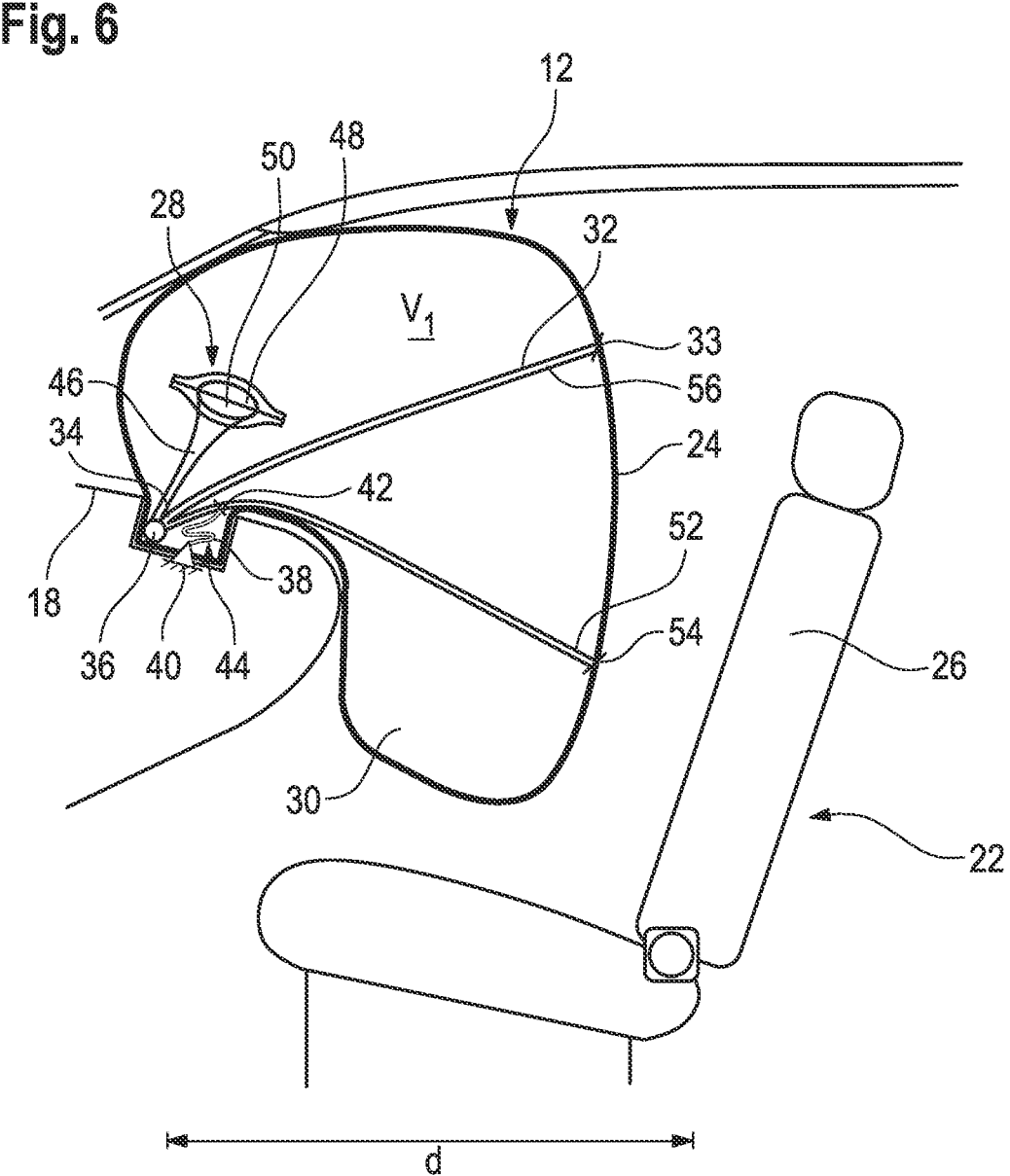
FIG. 6 shows a schematic view of the vehicle occupant protection system of FIG. 1 in a second exemplary arrangement, with the airbag being illustrated during filling.

FIG. 6 shows an exemplary arrangement in which the airbag module 14 is arranged in an instrument panel 18 of the vehicle, with the airbag 12 being designed as a passenger airbag.

The general structure of the vehicle occupant protection system 10 as well as the behavior thereof in the different situations of restraint and thus also the method carried out by the vehicle occupant protection system 10 are identical for both exemplary arrangements, however.

A vehicle occupant 20 in a vehicle seat 22 which is assigned to the airbag module 14 is caught in a restraint situation by the filled airbag 12, wherein the vehicle occupant immerses into a baffle provided on a front panel 24 of the airbag 12.

The vehicle seat 22 and thus the vehicle occupant 20 may be at different distances d from the airbag module 14, as the vehicle seat 22 is adjustable along a longitudinal direction of the vehicle. In the method for protecting a vehicle occupant 20 described here, two distances $d_1$, $d_2$ are of interest, wherein each of the distances $d_1$, $d_2$ can stand for a distance range comprising e.g. 20 to 50 cm.

The distance $d_1$ describes a seat distance at which the vehicle seat 22 is placed relatively close to the airbag module 14, i.e. relatively close to the steering wheel 16 or to the instrument panel 18. Such seat distance is adopted in a driving situation, for example, in which the hands of the vehicle occupant 20 are lying on the steering wheel 16. When the vehicle seat 22 is provided at a seat distance $d_1$, this is also referred to as the first tor front sitting position or else as driving position here.

The distance $d_2$ describes a seat distance at which the vehicle seat 22 is significantly further distant from the steering wheel 16 or the instrument panel 18 than at the distance $d_1$. This position of the vehicle seat, here also referred to as second or rear sitting position or as comfort position, is adopted e.g. in a comfort situation in which the vehicle drives autonomously and the vehicle occupant 20 is not busy driving the vehicle. It is also imaginable that in the second sitting position a backrest 26 of the vehicle seat 22 is folded back. Here, it would also be possible that the vehicle seat 22 is closer to the vehicle module 14 than the distance $d_2$, as a torso of the vehicle occupant 20 is further distant from the airbag module 14 by the leaned-back position. Hence it is imaginable that in the comfort position only the torso of the vehicle occupant 20 is located at a distance $d_2$ from the airbag module 14.

It is possible that especially the distance $d_1$ may slightly vary, as a taller vehicle occupant 20 possibly adjusts the vehicle seat 22 at a somewhat larger distance from the vehicle front end than a smaller vehicle occupant 20. However, this variation should not reach the distance $d_2$ in the second rearward sitting position.

The filling behavior of the airbag 12 is different in response to the sitting position.

In the first sitting position, upon activation of the airbag module 14 in a restraint situation the airbag 12 is always filled only up to a first smaller volume $V_1$ (see FIGS. 1 and 2), while in the second sitting position upon activation of the airbag module 14 the airbag 12 is always filled up to a second larger volume $V_2$ so as to take the larger distance of the vehicle occupant 20 from the airbag module 14 into account (see FIG. 3).

The airbag 12 here has a venting device 28 that can adopt a closed state and an opened state, wherein in the opened state (also referred to as opened venting device 28) gas can escape from the interior 30 of the airbag 12 to the environment.

When the vehicle seat 22 is in the first sitting position, the venting device 28 is opened in response to a body height $K_1$, $K_2$ of the vehicle occupant 20 in the vehicle seat 22.

When the vehicle occupant 20 has a first body height $K_1$ which is larger than a predetermined limit, the venting device 28 remains closed in the situation of restraint. As a result, the airbag 12 has such great hardness that it can safely catch the tall vehicle occupant 20.

When the vehicle occupant 20, on the other hand, has a second body height $K_2$ which is smaller than the predetermined limit and thus is smaller than the first body height $K_1$, the venting device 28 is opened in the restraint situation so that the airbag 12 becomes softer and the forces are reduced during immersion.

For determining the limit value of the body height, for example the values of a 50% dummy and a 95% dummy or the values of a 5% dummy and a 50% dummy are considered.

In the interior 30 of the airbag 12, a first tether 32 is arranged which is permanently fixed to the inside of the front panel 24 of the airbag 12 at an airbag-side fastening point 33 and which is fastened on the module side at a first module-side fastening point 34 on an actuator unit 36 fixed to the module so that it detaches on the module side when the actuator unit 36 is activated.

The actuator unit 36 is, for example, a tether activation unit (TAU) known per se that may comprise an explosive stud which is activated by a control signal transmitted by a control unit (not shown) and which then releases the first module-side fastening point 34 of the first tether 32. When the actuator unit 36 is not actuated, the first tether 32 remains fixed to its first module-side fastening point 34 in a manner fixed to the module and thus fixed to the vehicle.

Here, a fastening fixed to the module is understood to be a fastening fixed to the vehicle in the area of the airbag module 14, for example on a housing of the airbag module 14 or on the gas generator of the airbag module 14.

Moreover, a second tether 38 which is fixed to a second module-side fastening point 40 on the module side and which is connected to the first tether 32 at a tether connecting point 42 is arranged in the interior 30 of the airbag 12.

In the extension of the second tether 38 a decoupling arrangement 44 is arranged which triggers, when a predetermined force threshold is exceeded, and then interrupts the extension of the tether along the second tether 38.

The decoupling arrangement 44 can be designed in any way. In the present example it is realized by a tear seam which is provided either at the second module-side fastening point 40 of the second tether 38 (see FIG. 4a) or at the tether connecting point 42 (see FIG. 5) for fastening the second tether 38. Upon exceeding the predetermined force threshold, the tear seam comes undone and the second tether 38 is released at the respective fastening point. It would be equally imaginable to arrange a tear seam or perforation between the second module-side fastening point 40 and the tether connecting point 42. It would also be possible to completely replace the second tether 38 with a suitable decoupling arrangement 44.

In an extension of the tether from the second module-side fastening point 40 of the second tether 38 to the airbag-side fastening point 33 of the first tether 32, the second module-side fastening point 40 of the second tether 38, the tether connecting point 42, the first module-side fastening point 34 of the first tether 32 and the airbag-side fastening point 33 of the first tether 32 are located successively in the force path. This means that a force F which, usually starting from the front panel 24 of the airbag 12, acts on the first tether 32 is introduced to the vehicle through the first module-side fastening point 34 of the first tether 32 and the actuator unit 36, as long as the actuator unit 36 is not activated. In this case, the decoupling arrangement 44 is so-to-speak bridged.

Only when the actuator unit 36 is activated and thus the first module-side fastening point 34 of the first tether 32 is freely suspended in the interior 30 of the airbag 12, forces acting on the first tether 32 are transmitted via the tether connecting point 42 to the second tether 38 and thus to the decoupling arrangement 44.

In the interior 30 of the airbag 12, here moreover a venting tether 46 is provided which is connected to the venting device 28 and, on the module side, to the actuator unit 36, When the actuator unit 36 is activated, also the venting tether 46 is always released. As a result, the venting device 28 is opened and gas may escape from the interior 30 of the airbag.

Figure 4:
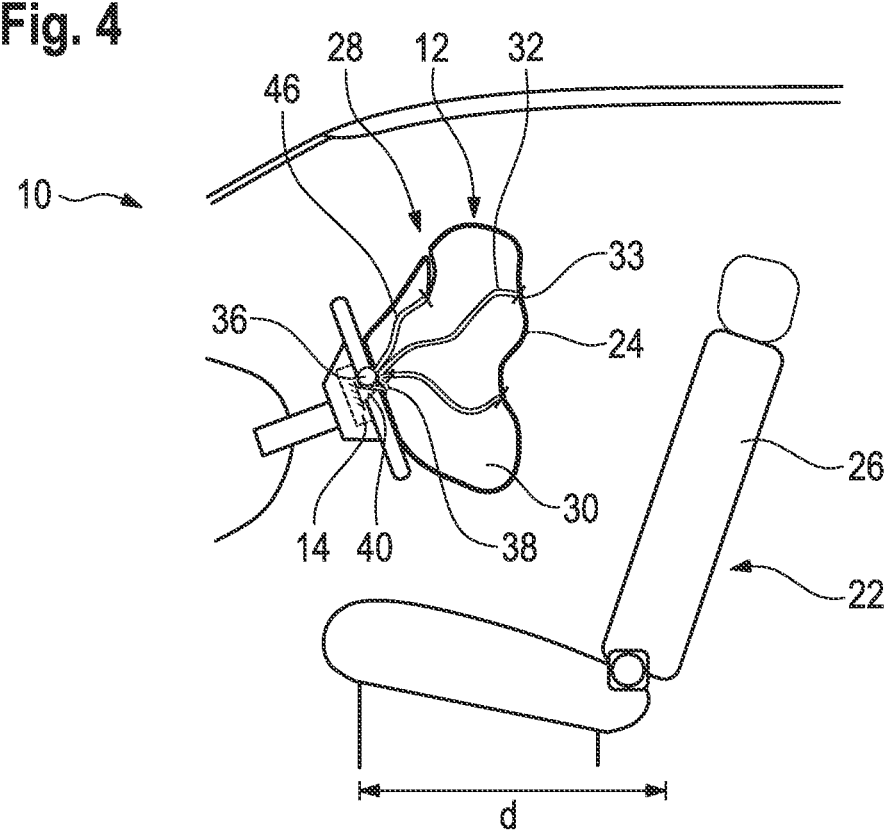
FIG. 4 shows a schematic view of the vehicle occupant protection system of FIG. 1 in a first exemplary arrangement, with the airbag being illustrated during filling.
Figure 4A:
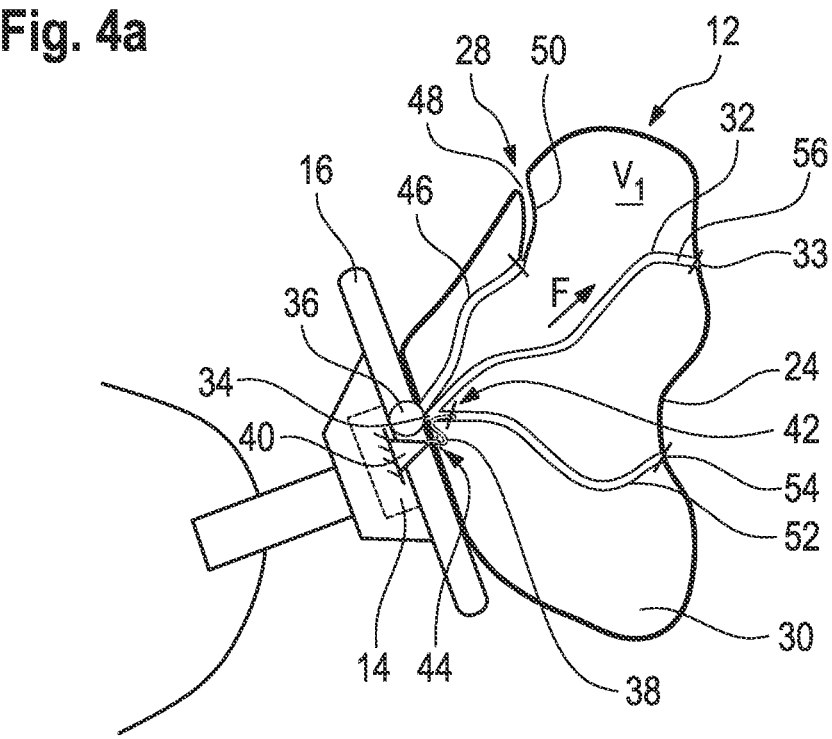
FIG. 4a shows an enlarged cutout from FIG. 4.

Here, the venting device 28 is realized by a venting hole 48 in the panel of the airbag 12 and a flap 50 connected to the venting tether 46 (see FIG. 4a). In the shown exemplary arrangements, the venting device 28 is configured so that the flap 50 closes the venting opening 48, as long as the venting tether 46 is tensioned and the flap 50 releases the venting hole and thus opens the venting device 28, when the venting tether 46 is released by the actuator unit 36.

When the actuator unit 36 is not activated, also the venting device 28 remains closed. When the actuator unit 36 is activated, the venting device 28 is always opened.

So that the tether connecting point 42 interconnecting the first tether 32 and the second tether 38 can be located in the tether extension ahead of the first module-side fastening point 34 of the first tether 32 on the actuator unit 36, the first tether 32 must extend at least somewhat beyond the first module-side fastening point 34.

In the examples shown here, the first tether 32 is configured to be so long that its second end 52 extends beyond the tether connecting point 42 to the front panel 24 of the airbag 12, where it is permanently fixed to the front panel 24 in a further airbag-side fastening point 54. The first end 56 is fastened to the front panel 24 at the airbag-side fastening point 33.

The tether connecting point 42 and the first module-side fastening point 34 are located between the ends 52, 56 and, in this example, approximately in the middle of the extension of the first tether 32 so that the first tether 32 extends in V-shape in the interior 30 of the airbag 12, when the actuator unit 36 is not activated and the airbag 12 is filled. When the actuator unit 36 is not activated, therefore a tensile force also acts on the portion of the first tether 32 that extends between the first module-side fastening point 34 and the airbag-side fastening point 54 on the front panel 24.

The second tether 38 is longer, however, than the length of the first tether 32 between the tether connecting point 42 and the first module-side fastening point 34, and the second module-side fastening point 40 of the second tether 38 is positioned on the module side so that loading of the second tether 38 is suppressed, when the actuator unit 36 is not activated.

When the actuator unit 36 is not activated, the ends 54, 56 of the first tether 32 fixed to the front panel 24 of the airbag 12 exert tensile force on the front panel 24 and prevent the airbag 12 from expanding to a volume exceeding a first volume V (see also FIGS. 1 and 2 as well as FIGS. 7 to 13).

Only when the actuator unit 36 is activated and releases the first module-side fastening point 34 of the first tether 32 and additionally triggers the decoupling arrangement 44, can the first module-side fastening point 34 of the first tether 32 move freely into the interior 30 of the airbag 12 and thus exerts no more tensile force on the front panel 24 of the airbag 12. The latter then fills up to its second larger volume $V_2$ (see FIG. 3 as well as FIGS. 14 to 16).

Figure 5:
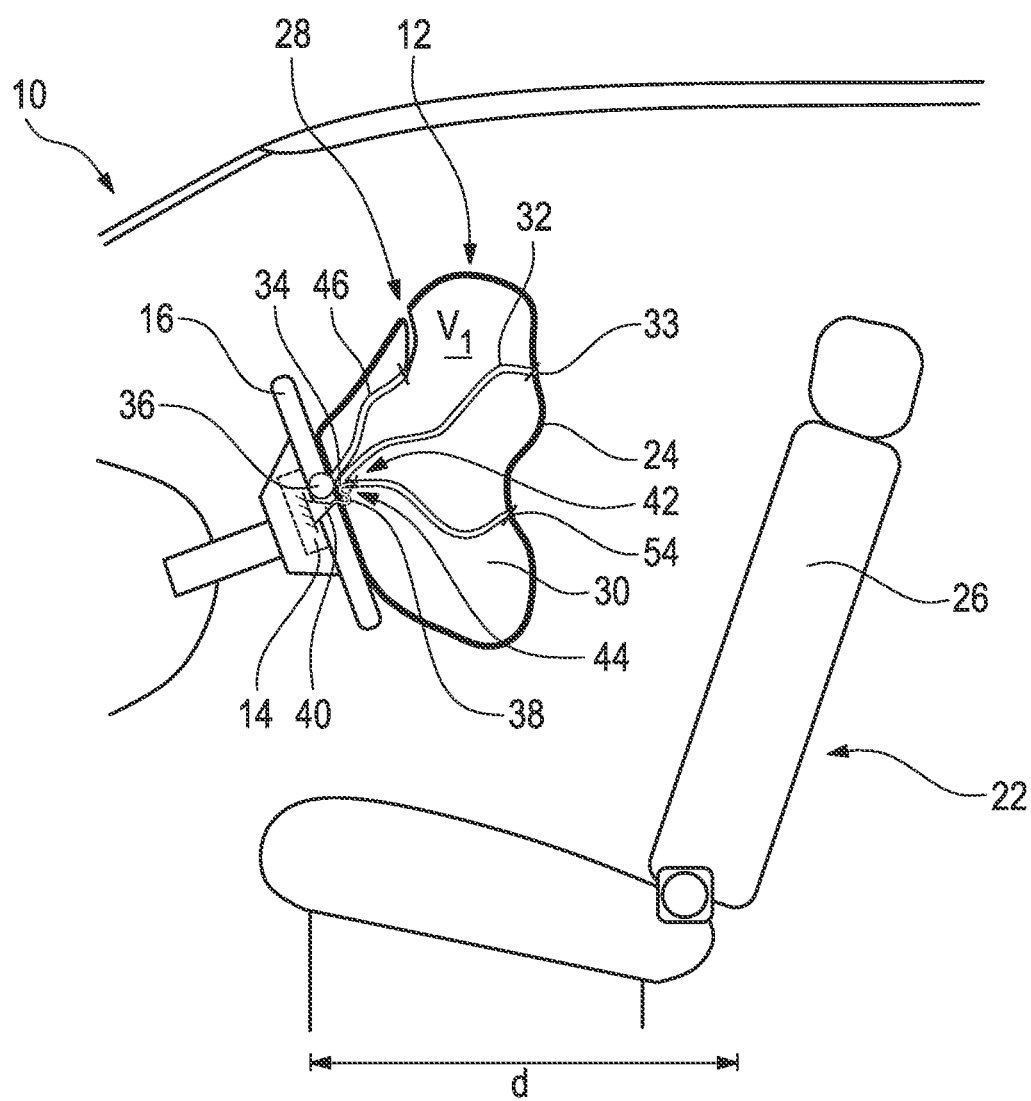
FIG. 5 shows a variant of the vehicle occupant protection system of FIG. 4.

FIGS. 4 and 5 illustrate the airbag module 14 designed for being mounted in the steering wheel 16. The only difference between the shown variants resides in the fact that the decoupling arrangement 44 in FIG. 4 is formed by a tear seam at the second module-side fastening point 40 of the second tether 38, while in FIG. 5 the decoupling arrangement 44 is realized by a tear seam at the tether connecting point 42.

The venting device 28 is arranged at an upper panel portion of the airbag 12 facing the windscreen of the vehicle.

FIG. 6 illustrates the airbag module 14 designed for being mounted in the instrument panel 18. The principle of functioning is identical. The decoupling arrangement 44 is designed as in the variants of FIGS. 4 and 5 (not shown in greater detail).

Here, the venting device 28 is arranged in a laterally directed panel portion of the airbag 12 so that the shape of the flap 50 closing the venting hole 48 as long as the venting tether 46 is fixed to the actuator unit 36 is visible.

In FIGS. 4, 5 and 6, respectively, the actuator unit 36 is not triggered.

FIGS. 7 to 16 illustrate the method for protecting a vehicle occupant by an afore-described vehicle occupant protection system 10 in the three different restraint situations in greater detail.

Figure 7:
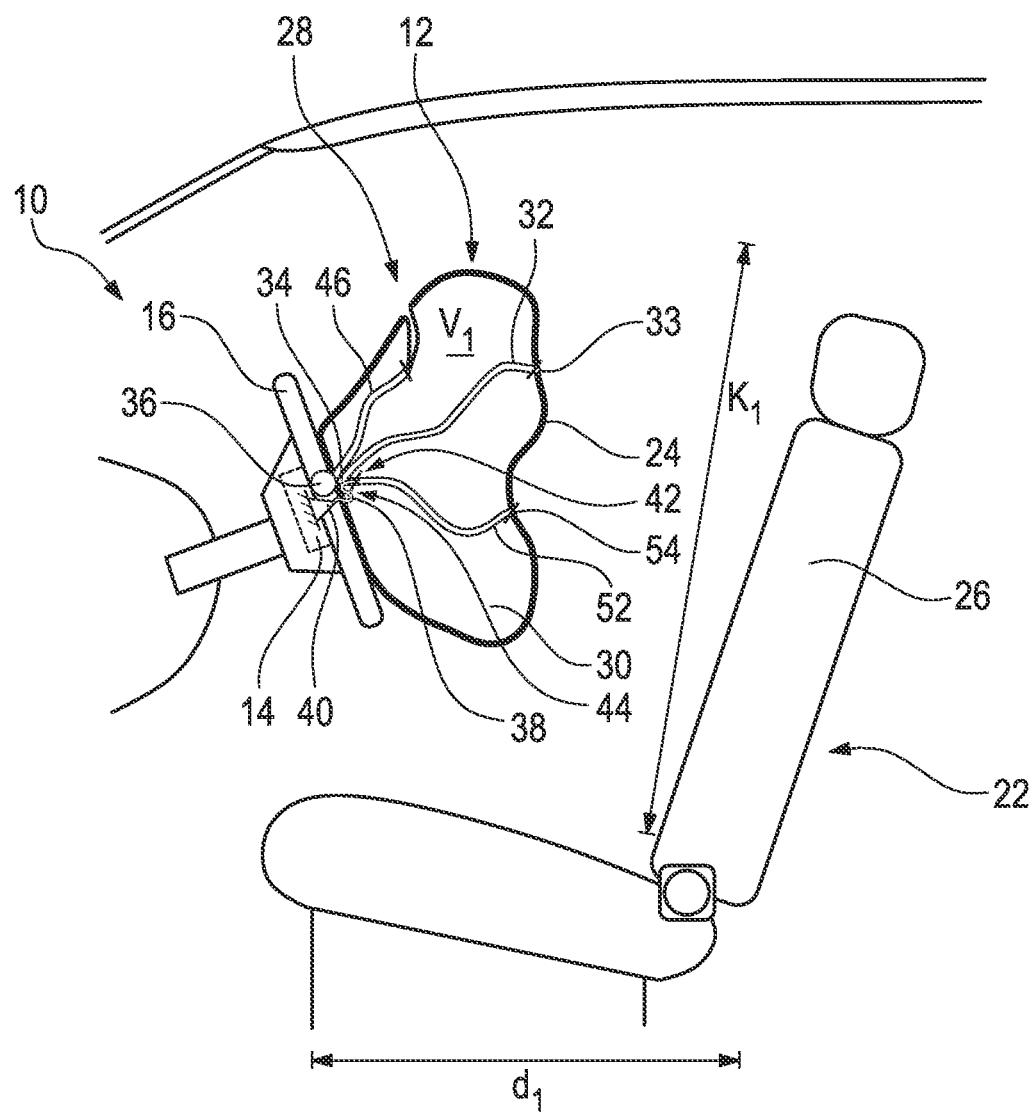
FIGS. 7 to 9 show the vehicle occupant protection system of FIG. 4 during the filling of the airbag in the first restraint situation.
Figure 8:
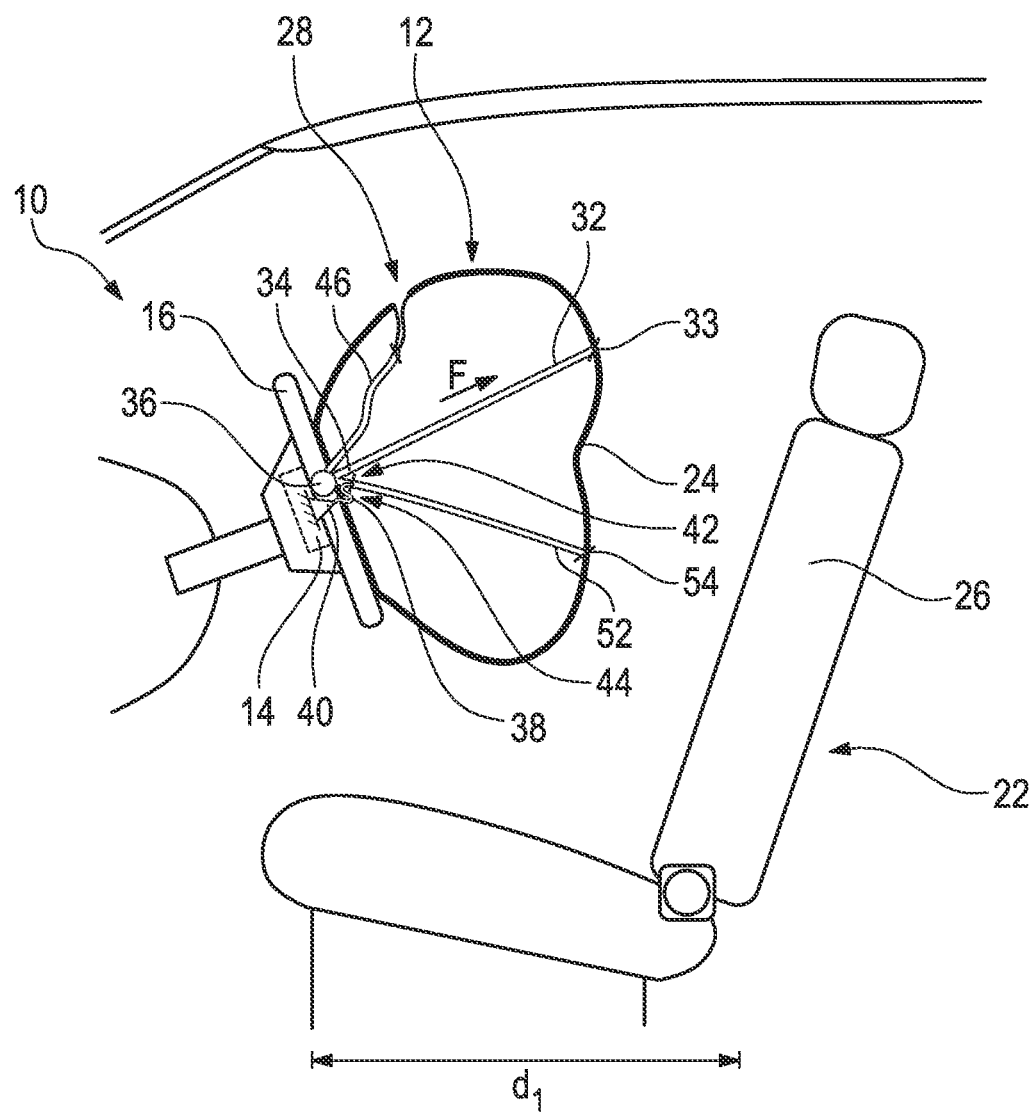
Figure 9:
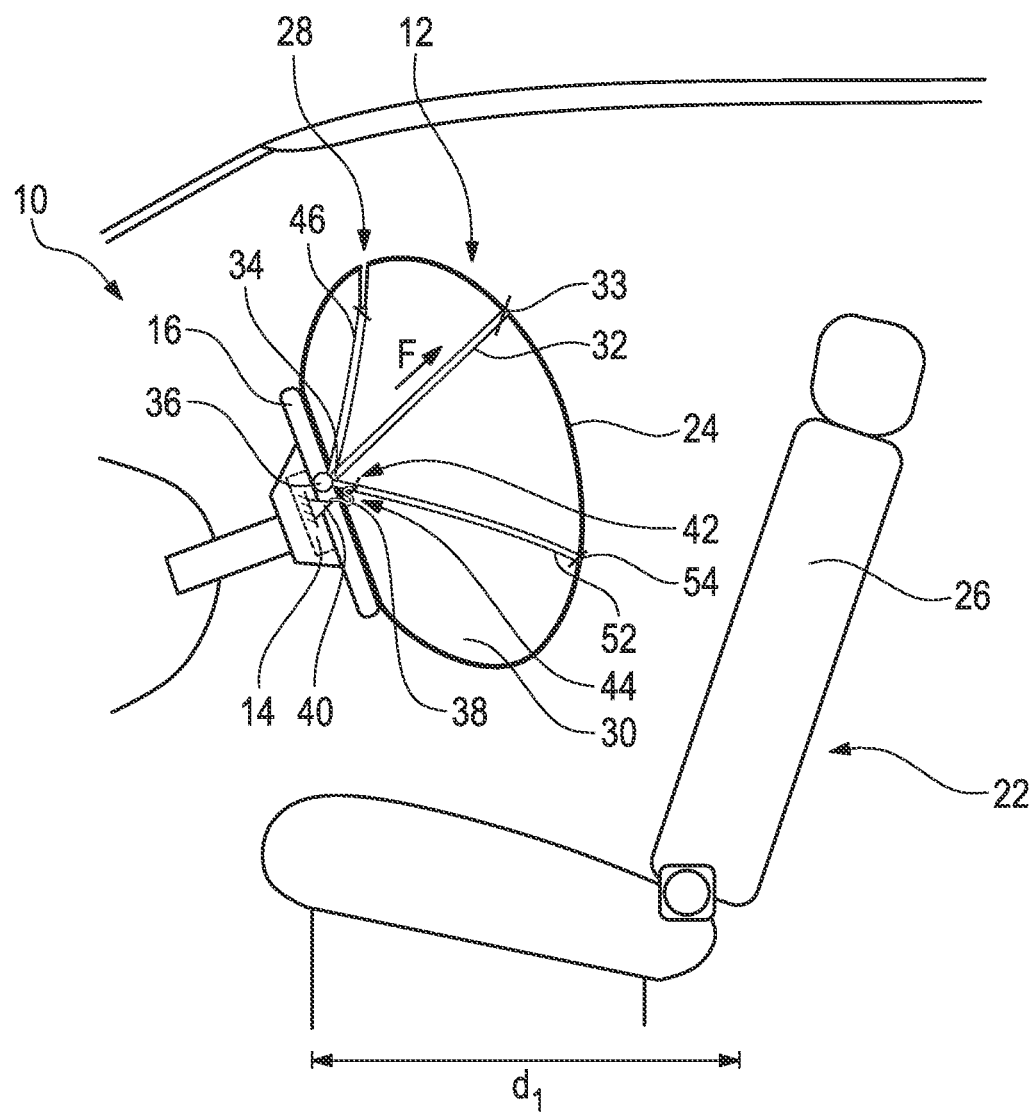

The first restraint situation shown in FIGS. 7 to 9 describes the behavior of the vehicle occupant protection system 10 in a situation of restraint in which a tall vehicle occupant 20 of a first body height $K_1$ is sitting at the first forward sitting position at the distance $d_1$ from the airbag module 14.

In this case, the airbag 12 is to be filled with the first smaller volume $V_1$ but with sufficient hardness for catching a tall vehicle occupant 20.

FIG. 7 illustrates the airbag 12 in the initial phase of filling just after the start of filling. The actuator unit 36 is not triggered so that both the first tether 32 and the venting tether 46 remain fixed tightly to the actuator unit 36 and thus in a manner fixed to the module.

FIG. 8 illustrates the airbag 12 in a middle phase during filling, the airbag 12 already having adopted almost its final shape.

FIG. 9 finally shows the airbag 12 after the final phase of filling in the completely filled state with the first smaller volume $V_1$. The actuator unit 36 is still has not been activated so that even in the completely filled state the front panel 24 is retained by the intact first tether 32, which is still fixed on the module side by its first module-side fastening point 34 on the actuator unit 36, at its desired distance from the airbag module 14. The venting tether 46 is equally still fixed on the actuator unit 36 in a way fixed to the module so that the venting device 28 remains closed.

All forces acting on the first tether 32 are transferred into the vehicle via the actuator unit 36 and the first module-side fastening point 34 of the first tether 32. Therefore, the decoupling arrangement 44 remains always unloaded so that it is not adapted to trigger.

FIGS. 10 to 13 illustrate the behavior of the vehicle occupant protection system 10 in a second situation of restraint in which a smaller vehicle occupant 20 of a second body height $K_2$ is sitting at a distance $d_1$ the first forward sitting position, while the situation of restraint occurs.

Figure 10:
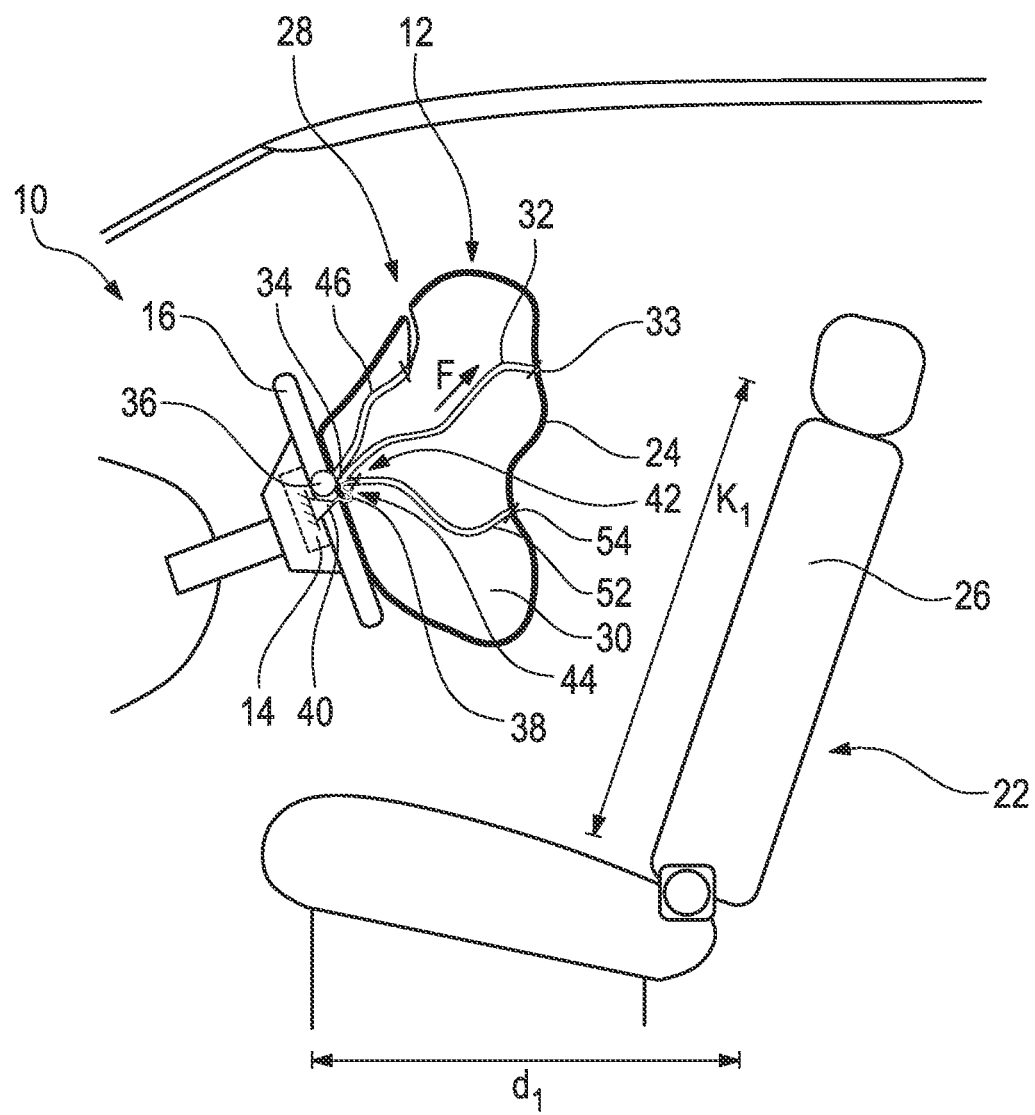
FIGS. 10 to 13 show the vehicle occupant protection system of FIG. 4 during the filling of the airbag in the second restraint situation.

FIG. 10 shows an initial phase of the filling of the airbag 12.

The actuator unit 36 is not activated so that both the first tether 32 and the venting tether 46 remain held on the actuator unit 36 in a manner fixed to the module. Since no force can act on the decoupling arrangement 44, the latter mill not trigger.

Figure 11:
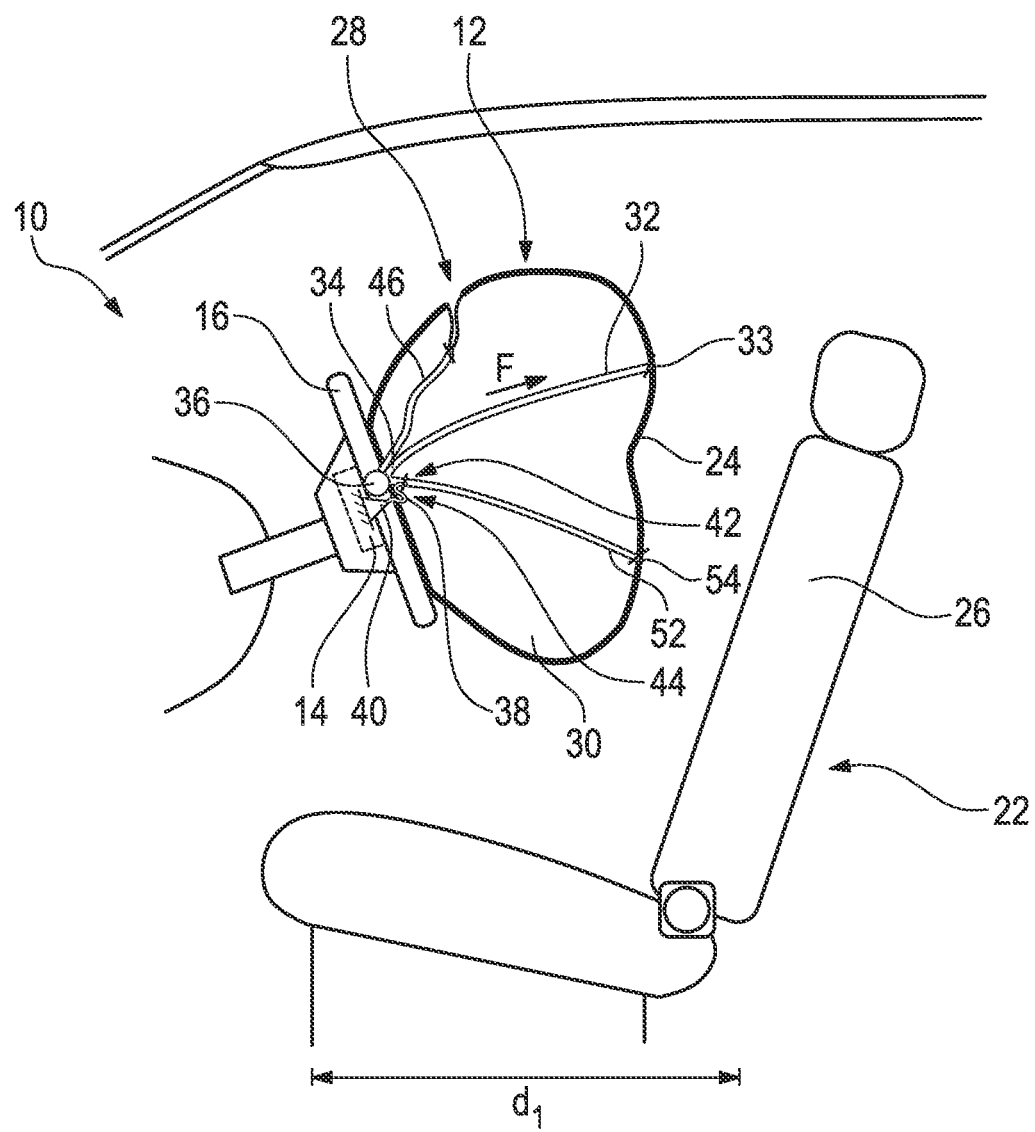

FIG. 11 illustrates a middle phase of the filling of the airbag 12 during which the front panel 24 moves toward the vehicle seat 22.

Figure 12:
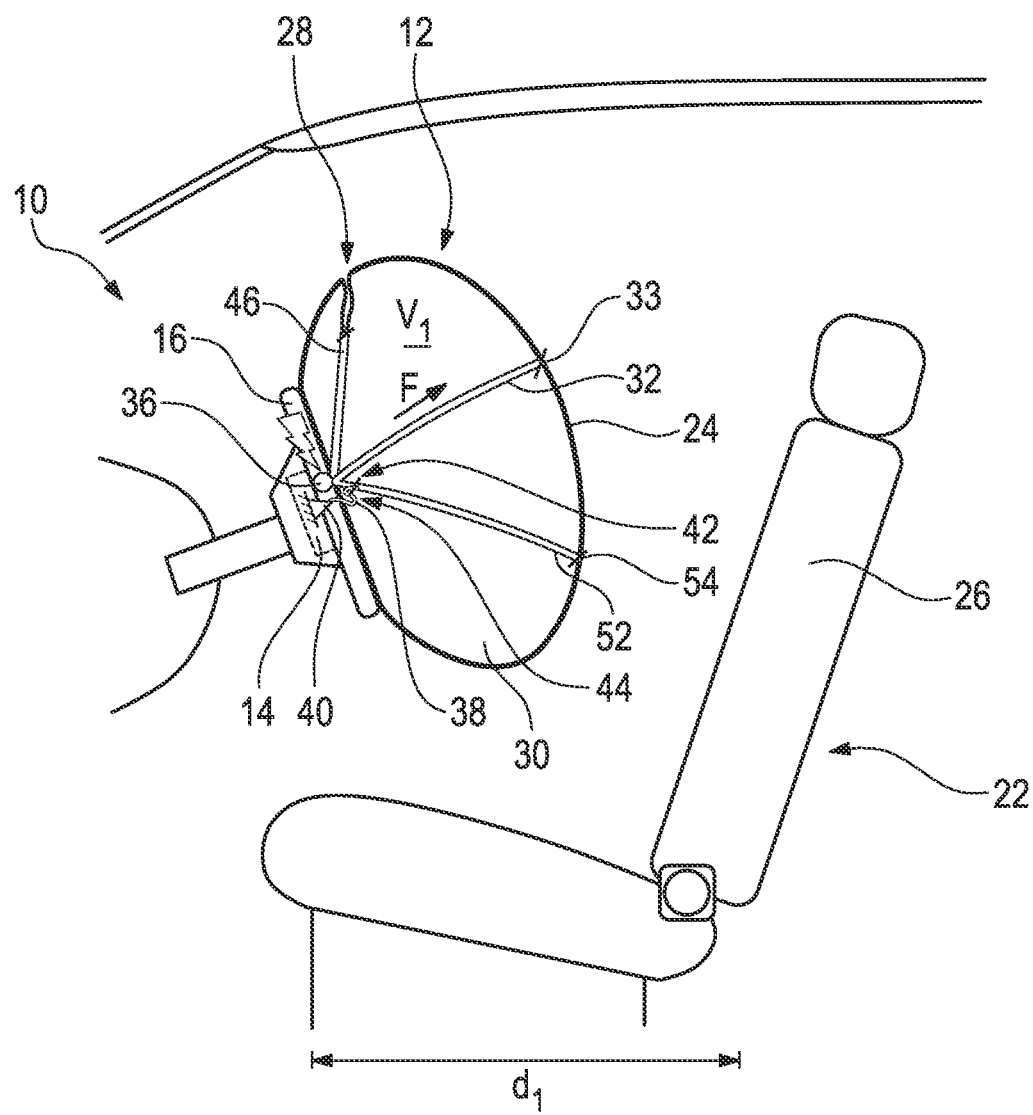

FIG. 12 shows a final phase of filling in which the front panel 24 has substantially come to rest and the airbag 12 has substantially adopted its first smaller volume $V_1$.

On the tether 32 there are no longer acting the dynamic forces which have occurred while the front panel 24 has moved outwardly but there are merely acting the static forces which are caused by the internal pressure of the airbag 12, with the internal pressure already having reached substantially its maximum value.

At this point in time, now the actuator unit 36 is activated and both the first tether 32 at its first module-side fastening point 34 and the module-side end of the venting tether 46 is detached from the airbag module.

Figure 13:
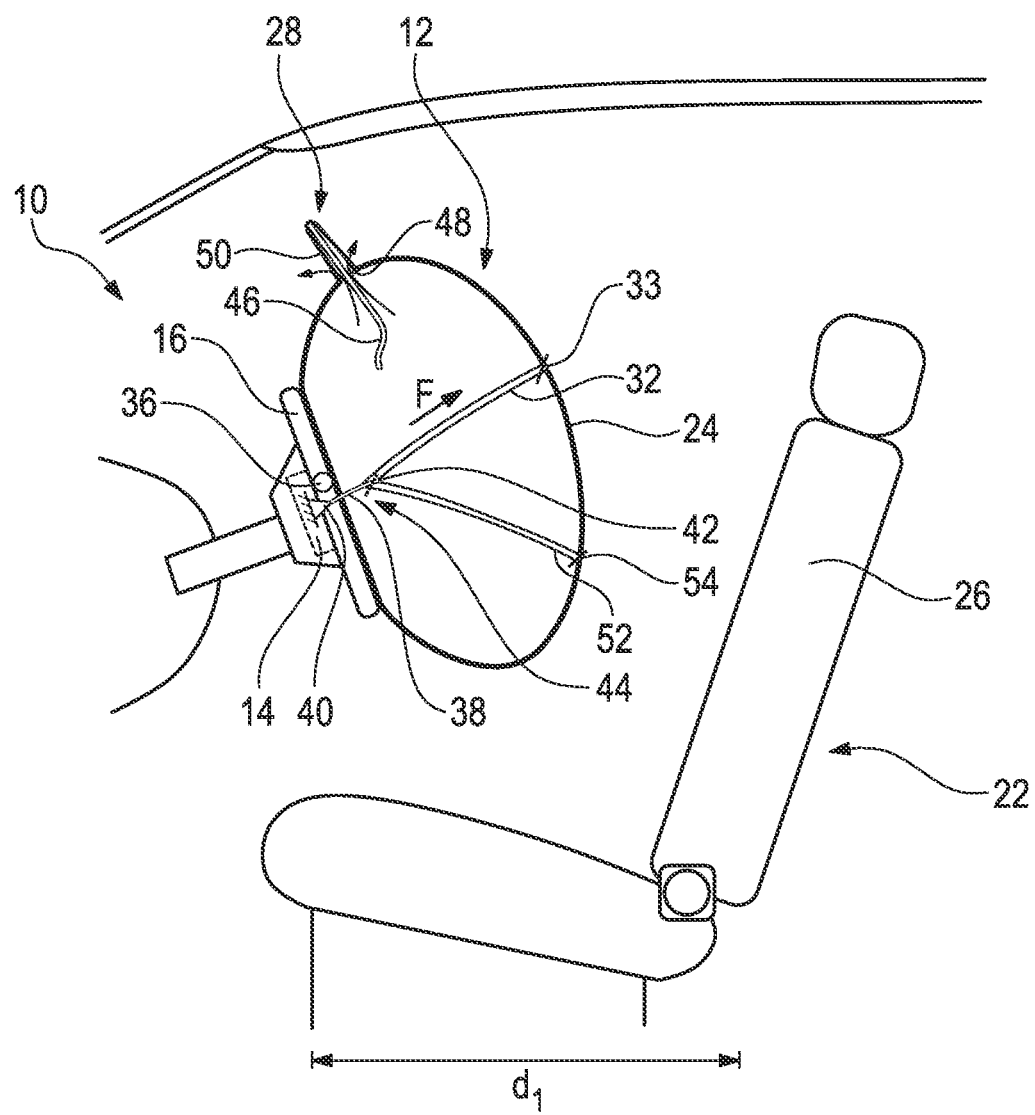

FIG. 13 illustrates the final state. Although the second tether 38 and also the decoupling arrangement 44 now are located in the flow of forces between the airbag-side fastening point 33 of the first tether 32 and the second module-side fastening point 40 of the second tether 38, the force acting on the decoupling arrangement 44 remains below the predetermined force threshold and is not sufficient to trigger the decoupling arrangement.

The force threshold from which the decoupling arrangement 44 triggers is generally selected such that purely static forces acting on the first tether 32 after the filling of the airbag 12 are not sufficient to exceed the force threshold. Forces that are high enough to trigger the decoupling arrangement 44 are reached only during the dynamic initial and middle filling phases, especially during a quick upward movement of the front panel 24. Hence, when the actuator unit 36 is activated in the final phase of the filling of the airbag 12 in which the airbag has already substantially adopted its position in the vehicle interior and has substantially reached the first volume $V_1$, the forces acting on the first tether 32 are no longer sufficient to release the decoupling arrangement 44.

As a consequence, the second tether 38 remains fastened both to the second module-side fastening point 40 and to the tether connecting point 42, and the module-side fastening of the first tether 32 is maintained via the second tether 38.

The length of the second tether 38 is selected to be so short that the volume of the airbag 12 achieved in this state still corresponds to the first volume $V_1$ for all practical needs.

In contrast to the afore-described first situation of restraint, however, the venting device 28 is opened by activating the actuator unit, as the venting tether 46 is released on the module side. Thus, gas can escape from the interior 30 of the airbag 12, thereby enabling the smaller vehicle occupant 20 to be caught more softly.

Figure 14:
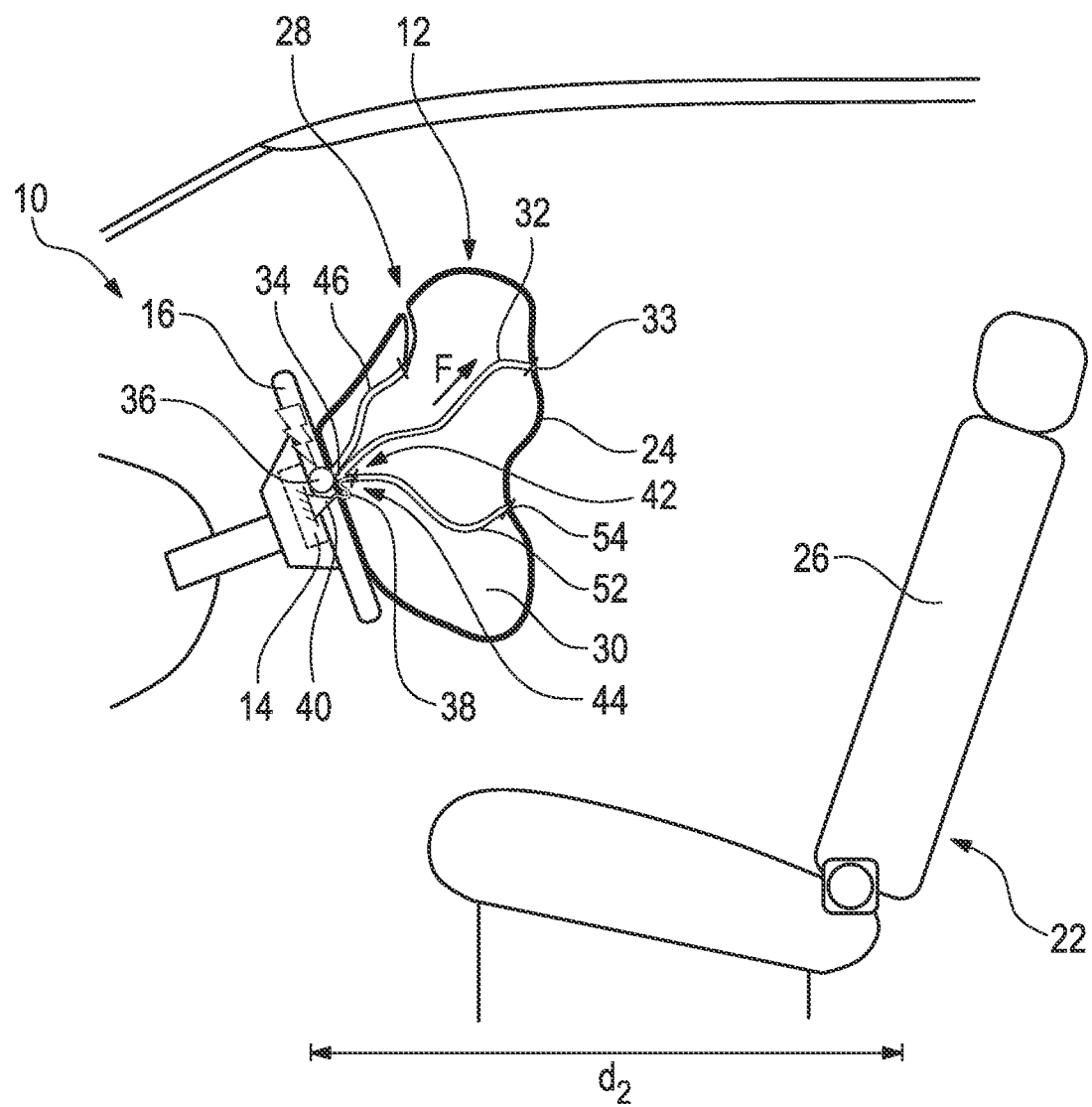
FIGS. 14 to 16 show the vehicle occupant protection system of FIG. 4 during the filling of the airbag in the third restraint situation.
Figure 15:
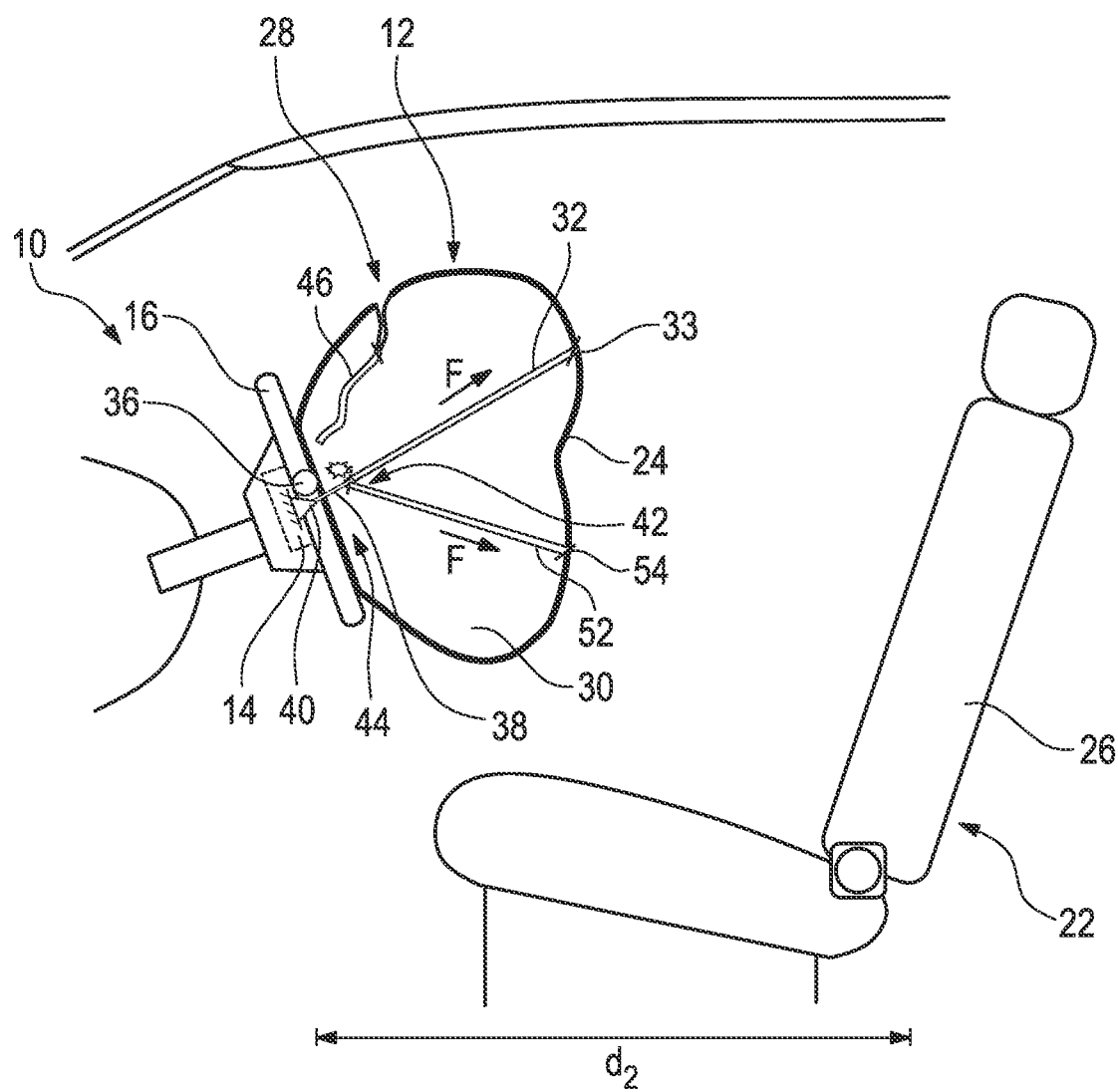
Figure 16:
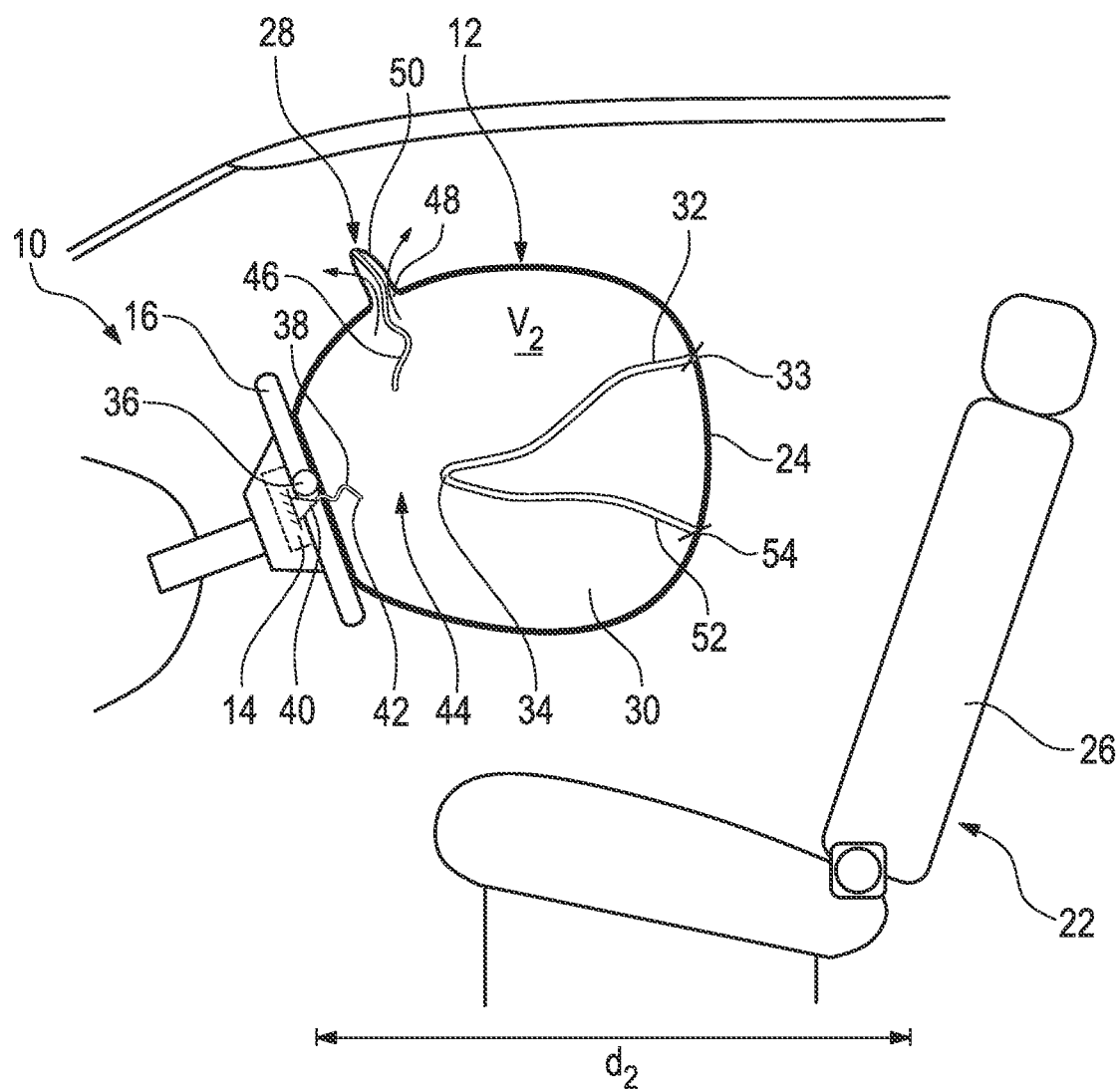

FIGS. 14 to 16 illustrate the behavior of the vehicle occupant protection system 10 in a third situation of restraint.

In this case, a vehicle occupant 20 of any body height $K_1$, $K_2$ is sitting in the vehicle seat 22 at the second rearward sitting position at a distance $d_2$ from the airbag module 14.

FIG. 14 illustrates the vehicle occupant protection system 10 in the initial phase of the filling of the airbag 12. Already in this phase, where necessary already while activating the gas generator of the airbag module 14, the actuator unit 36 is activated so that the first module-side fastening point 34 of the first tether 32 and the module-side fastening of the venting tether 46 are released and are detached from the airbag module 14.

A point in time shortly after activation of the actuator unit 36 is illustrated in FIG. 15. Since the decoupling arrangement 44 now is located in the flow of forces between the front panel 24 of the airbag 12, the first tether 32 and the second module-side fastening point 40 of the second tether 38, the forces occurring during deployment of the airbag 12 which are caused by the front panel 24 moving away quickly from the airbag module 14, will act on the decoupling arrangement 44 via the first tether 32. Said forces are above the predetermined force threshold so that the decoupling arrangement 44 triggers and the connection of the first tether 32 fixed to the module is suspended.

As described above, this may take place, for example, by the fact that the connection of the second tether 38 to the first tether 32 at the tether connecting point 42 or the connection of the second tether to the airbag module 14 at the second module-side fastening point 40 is released. In the example illustrated here, the decoupling arrangement 44 is provided at the tether connecting point 42.

FIG. 16 illustrates the final phase of the filling of the airbag 12 in which the airbag adopts its completely filled state. Since neither the actuator unit 36 nor the second tether 38 withholds the first tether 32 at the airbag module 14 in a way fixed to the module, the front panel 24 can move further in the direction of the vehicle seat 22 than in the first two situations of restraint. Therefore, the airbag 12 fills up to its second larder volume $V_2$.

Both ends 52, 56 of the first tether 32 remain tightly connected to the front panel 24 of the airbag 12, but the tether connecting point 42 is located freely in the interior 30 of the airbag 12.

Since also the venting tether 46 has been released by the actuator unit 36, the venting device 28 opens, just as in the second situation of restraint, so that gas may escape from the interior 30 of the airbag 12 and the airbag 12 becomes softer.

For an airbag module 14 which is arranged in the instrument panel 18 the three restraint situations as described are run analogously. The principle of the disclosure can also be realized for airbag modules 14 at other positions of any vehicle, as a matter of course.

The invention claimed is:

1. A vehicle occupant protection system comprising an airbag module including an airbag having first and second tethers extending in an interior of the airbag and an actuator unit fixed to the module,
   wherein the first tether is permanently fastened to an airbag-side fastening point on a front panel of the airbag and is detachably fixed to the actuator unit on the module side at a first module-side fastening point, and the second tether is arranged on the module side at a second module-side fastening point and is connected to the first tether at a tether connecting point, wherein in the extension of the second tether between the second module-side fastening point and the tether connecting point there is provided a decoupling arrangement which triggers when a predetermined force threshold is exceeded,
   wherein activation of the actuator unit releases the first tether on the module side and
   wherein the decoupling arrangement is located between the second module-side fastening point of the second tether and the airbag-side fastening point of the first tether only when the actuator unit is activated,
   wherein a length of the second tether is longer than a length of the first tether as measured between the tether connecting point and the first module-side fastening point.

2. The vehicle occupant protection system according to claim 1, wherein an extension of the tether from the second module-side fastening point of the second tether via the tether connecting point and the first module-side fastening point of the first tether on the actuator unit to the airbag-side fastening point of the first tether, when viewed in the direction of the airbag-side fastening point of the first tether, the first module-side fastening point of the first tether is located behind the tether connecting point and the second module-side fastening point of the second tether.

3. The vehicle occupant protection system according to claim 2, wherein the force threshold is selected so that, with the actuator unit being activated, during an initial phase or a middle phase of filling of the airbag the first tether exerts a force on the decoupling arrangement which is above the force threshold, while in a final phase of the filling a force exerted by the first tether on the decoupling arrangement constantly remains below the force threshold.

4. The vehicle occupant protection system according to claim 3, wherein the first tether is permanently fastened to the airbag-side fastening point on the front panel at a first end and at a second end on the airbag panel, especially on the front panel, and the first module-side fastening point and the tether connecting point are located between the two ends of the first tether.

5. The vehicle occupant protection system according to claim 4, wherein the decoupling arrangement is arranged at the second module-side fastening point of the second tether, at the tether connecting point or therebetween.

6. The vehicle occupant protection system according to claim 5, wherein-there is provided a venting device on which a venting tether extending in the interior of the airbag and being detachably connected to the actuator unit will act.

7. The vehicle occupant protection system according to claim 6, wherein the venting device is designed such that the venting device is opened only when the venting tether is released by the actuator unit.

8. The vehicle occupant protection system according to claim 6, wherein a vehicle seat is provided which can adopt a first position and a second position, wherein in the second position the vehicle seat is further distant from the airbag module by a factor of about 1.5 to 2 than in the first position, and in that in the first position of the vehicle seat the airbag in the filled state adopts a first smaller volume and in the second position of the vehicle seat in the filled state adopts a second larger volume.

9. The vehicle occupant protection system according to claim 1, wherein the force threshold is selected so that, with the actuator unit being activated, during an initial phase or a middle phase of filling of the airbag the first tether exerts a force on the decoupling arrangement which is above the force threshold, while in a final phase of the filling a force exerted by the first tether on the decoupling arrangement constantly remains below the force threshold.

10. The vehicle occupant protection system according to claim 1, wherein the first tether is permanently fastened to the airbag-side fastening point on the front panel at a first end and at a second end on the airbag panel, especially on the front panel, and the first module-side fastening point and the tether connecting point are located between the two ends of the first tether.

11. The vehicle occupant protection system according to claim 1, wherein the decoupling arrangement is arranged at the second module-side fastening point of the second tether, at the tether connecting point or therebetween.

12. The vehicle occupant protection system according to claim 1, wherein there is provided a venting device on which a venting tether extending in the interior of the airbag and being detachably connected to the actuator unit will act.

13. The vehicle occupant protection system according to claim 6, wherein the venting device is designed such that the venting device is opened only when the venting tether is released by the actuator unit.

14. The vehicle occupant protection system according to claim 1, wherein a vehicle seat is provided which can adopt a first position and a second position, wherein in the second position the vehicle seat is further distant from the airbag module by a factor of about 1.5 to 2 than in the first position, and in that in the first position of the vehicle seat the airbag in the filled state adopts a first smaller volume and in the second position of the vehicle seat in the filled state adopts a second larger volume.

15. A method for protecting a vehicle occupant utilizing the vehicle occupant protection system according to claim 1, wherein there is provided a vehicle seat which can adopt a first position and a second position and which is provided for receiving a vehicle occupant, wherein the vehicle seat in the second position has a larger distance from an airbag module than in the first position, and wherein, in a situation of restraint that occurs when the vehicle seat is in the first position, an airbag of the airbag module is filled with a first smaller volume and, in response to a height of the vehicle occupant sitting in the vehicle seat, a venting device of the airbag is opened or closed, and in a situation of restraint that occurs when the vehicle seat is in the second position, the airbag is filled with a second larger volume and the venting device is opened.

16. The method according to claim 15, wherein in a restraint situation in which the vehicle seat is in the first sitting position, the actuator unit always is not activated or is activated only in a final phase of the filling of the airbag and the decoupling arrangement does not trigger, and in a situation of restraint in which the vehicle seat is in the second sitting position, the actuator unit always is activated and the decoupling arrangement triggers.

17. The method according to claim 16, wherein there is provided a venting device on which a venting tether extending in the interior of the airbag and being detachably connected to the actuator unit will act, and in that in the first sitting position, in response to a first, taller body height and a second smaller body height of a vehicle occupant in the vehicle seat, the actuator unit is activated in a final phase of the filling of the airbag when the vehicle occupant has the second smaller body height, and the actuator unit is not activated when the vehicle occupant has the first taller body height.

\* \* \* \* \*